Figure 1:
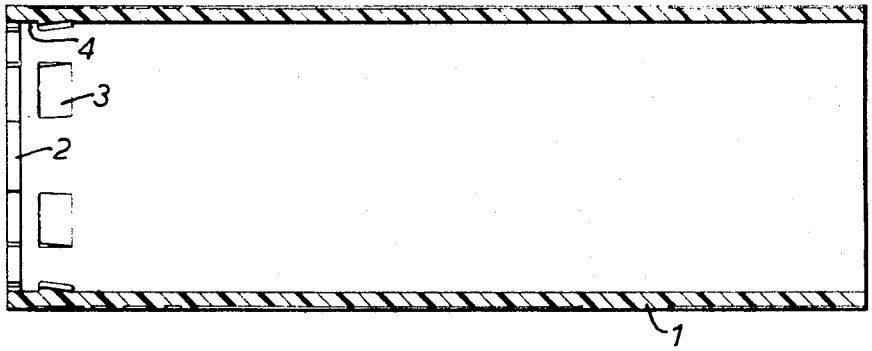

United States Patent [19]

Rees

[11] 3,741,251

[45] June 26, 1973

[54] COUPLING FOR MOULDED TUBULAR COMPONENTS

[75] Inventor: Clive Rees, Tyseley, Birmingham 11, England

[73] Assignee: Girling Limited, Birmingham, England

[22] Filed: Feb. 25, 1971

[21] Appl. No.: 118,922

[30] Foreign Application Priority Data
Mar. 3, 1970 Great Britain............... 10,104/70

[52] U.S. Cl..................................... 138/96, 285/399
[51] Int. Cl............................................ B65d 59/04
[58] Field of Search.................. 138/155, 109, 96, 138/96 T, 89; 285/7, 302, 304, 399

[56] References Cited
UNITED STATES PATENTS 2,973,972  3/1961  Von Den Baumen................. 285/7
2,551,834  5/1951  Ferguson............................. 138/96 T
3,967,067  1/1961  Singer................................ 285/399 X
2,985,469  5/1961  Bowman, Jr...................... 285/304 X
3,011,524  12/1961 Seils, Jr............................. 285/399 X Primary Examiner—William R. Cline
Attorney—Scrivener, Parker, Scrivener & Clarke

[57] ABSTRACT

An internal undercut groove or recess in a moulded tubular component is formed by two axially spaced rows of integral projections, the projection of each row registering with the space between adjacent projections in the opposite row. The component can thus be made without the use of a collapsible core tool. The invention also relates to a novel injection moulding core tool in two axially separable parts having interengaging axial projections of generally castellated form.

4 Claims, 6 Drawing Figures

COUPLING FOR MOULDED TUBULAR COMPONENTS

This invention relates to tubular components moulded from synthetic resin materials or other rigid or semi-rigid materials such as hard rubber having internal, undercut recesses of substantial circumferential extent, and to core tools for use in the injection moulding of such components.

As one example of such components, reference is made below to cylindrical dirt shields for telescopic dampers. It is frequently desired to form such a dirt shield with an internal annular groove, adjacent its upper end, to receive an end closure member arranged to make snap-fitting engagement in the internal groove, to form a permanent assembly.

Such a dirt shield of conventional design requires the use of a collapsible core tool, the core tool being collapsed for removal from the finished moulding. The manufacture and use in large quantity production of such core pieces is attended by many difficulties and disadvantages. Such cores are expensive to make and are liable to lead to difficulties in use, typically by reason of the core failing to expand and contract properly. They experience considerable wear, due to the constant insertion and extraction of a wedge or a core pin. As wear develops, the cores exhibit an increasing tendency to leave crevices which result in flashing in the finished moulding. Because of repeated heating and cooling of the core, the resilient parts thereof lose their temper and become brittle. In most prior art expansible cores, there is also difficulty in maintaining the core correctly centered in the mould, resulting in mouldings being produced with non-uniform wall thicknesses.

The present invention provides a tubular component of novel design, with respect to the formation of the undercut recess, and a novel core tool which overcome the above described disadvantages.

In accordance with the invention, there is provided a tubular component comprising a generally cylindrical moulding of synthetic plastics material having a female coupling portion, the coupling portion comprising two axially spaced, circumferential rows of spaced, internal projections integrally mounded with the cylindrical moulding, the projections of each row registering axially with spaces between the projections of the other row.

The invention also provides a core tool for use in injection moulding of a tubular component having an internal, undercut recess of substantially circumferential extent, the said core tool consisting of a pair of mating core parts arranged for relative axial movement into and out of butting engagement with each other and formed in the adjacent, mating ends with a series of axially directed recesses and intervening projections, the projections of one part extending partially into the recesses of the other part in the abutting position of the parts whereby the unfilled portion of the recesses may form, in the moulded article, two axially spaced sets of internal projections, each projection of one row being aligned with a space between adjacent projections in the other row.

The female coupling portion thus formed, although not strictly a groove in the sense of having uninterrupted side walls, functions as an internal undercut groove in the finished component.

Preferably, the circumferential width of each projection reduces in a direction away from the gap between the two rows of projections. This enables the core parts to be manufactured finished on a trial and error basis, so as to ensure close abutting interengagement between the projections on the two core parts and also ensures that in use, there is minimum sliding contact between the flanks of the projections to avoid wear of the flanks and resultant flashing in the moulded components. The projections can conveniently be mated in with each other by spark erosion techniques to achieve a highly accurate degree of interengagement.

Figure 2:
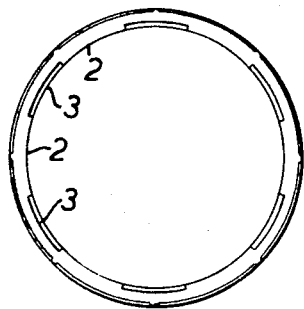
Figure 3:
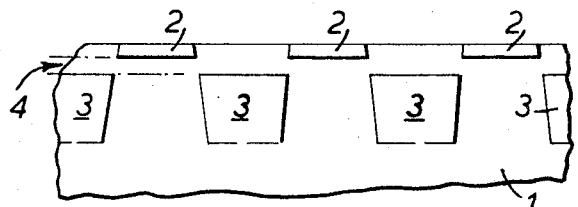
Figure 4:
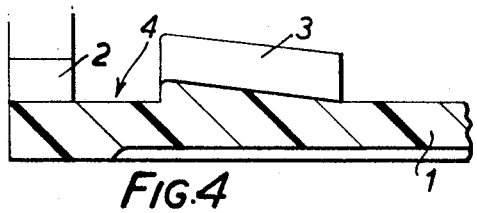
Figure 5:
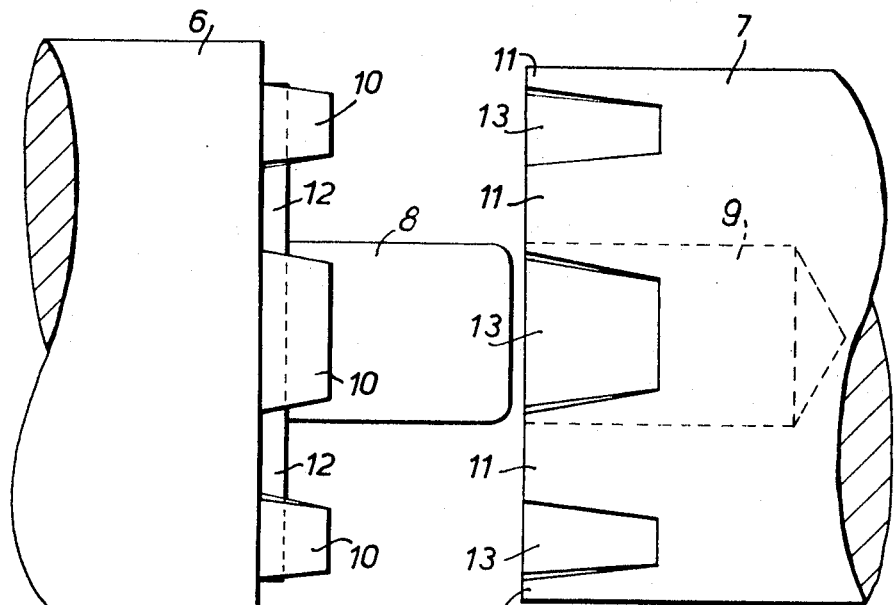
Figure 6:
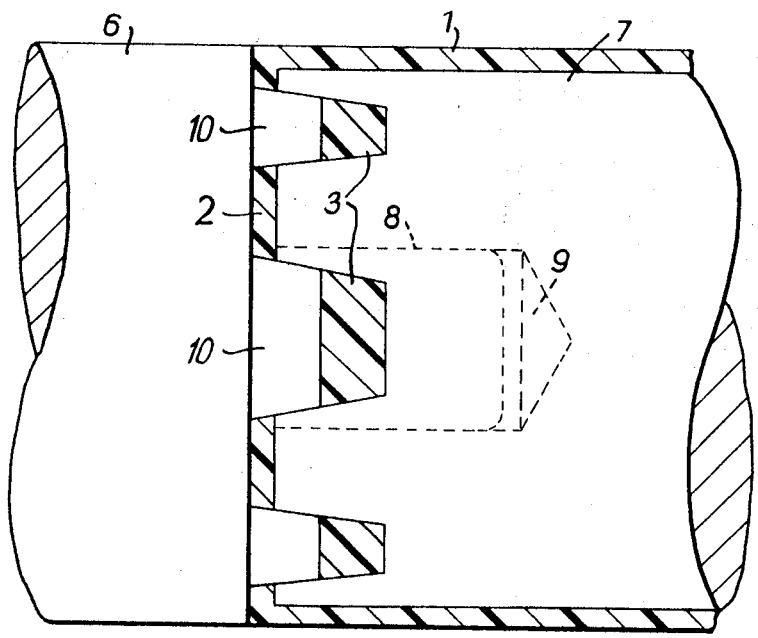

One example of a tubular component namely a dirt shield for telescopic damper, and a core tool for making it, in accordance with the invention, will now be described, by way of example only, with reference to the accompanying drawings, in which:

FIG. 1 is an axial cross-section of the dirt shield;
FIG. 2 is an end view;
FIG. 3 is a developed view of part of the internal surface of the dirt shield;
FIG. 4 is a scrap sectional view and
FIG. 5 is a side elevation of the core tool employed in production of the dirt shield, showing two core parts separated.
FIG. 6 is a side elevation of the core tool of FIG. 5, showing the two core parts engaged.

The dirt shield 1 is of generally cylindrical form, being moulded from a semi-rigid synthetic plastics material, such as polypropylene. Adjacent one end, the interior surface has a female coupling portion in the form of two axially spaced circumferential rows of spaced projections 2 and 3, defining between them a space in the form of an internal groove 4 having interrupted side walls, the base diameter of which is equal to or less than the internal diameter of the main part of the dirt shield. The projections 2 and 3 are each aligned with the space between an adjacent pair of projections in the opposite row, as is clearly illustrated in the developed internal view shown in FIG. 3.

The projections 3 all taper in radial thickness towards the far end of the dirt shield and merge smoothly with the internal surface of the shield, as best seen in FIG. 4, thus forming ramp surfaces to provide a lead-in to the groove 4 for a component, such as an end closure member destined to make snap fitting engagement in the groove 4. The circumferential width of each projection reduces in a direction away from the groove 4.

A preferred form of core tool for making the dirt shield is shown in FIGS. 5 and 6 and comprises two core parts 6 and 7 axially movable towards and away from each other. Correct alignment is assured by a pin 8 in one part locating in a recess 9 in the other. The mating ends of the core parts 6 and 7 are formed with axial projections in the form of castellations 10 and 11 respectively. The castellations 10 project from the end of the core part 6 and the spaces between the castellations 10 extend back beyond the end surface of the core part 6, thereby forming recesses 12 in the outer surface of the core part 6. The castellations 11 of the core part 7 do not project beyond the end of the core part 7, but are formed between recesses 13 in the outer surface of the core part 7. When the two core parts are brought together (as shown in FIG. 6) the castellations 10 project partially into the recesses 13 and the castellations 11 into the open space between the castellations 10.

The side faces of the castellations are slightly angled to permit a close interengagement which substantially prevents injected material entering between adjacent castellations to leave a flashing in the moulded article. The use of a solid and sturdy main core part 6 also assists in achieving a substantially uniform wall thickness in the moulded shield.

The remainder of the moulding tools and the injection moulding apparatus are largely conventional. The mould is axially split into two halves movable towards and away from each other, one half being water cooled and being provided with ejection pins to strip a finished moulding from that half. The core parts are axially movable towards and away from each other and relative to the mould parts. Molten material is injected while the mould parts are closed and the core parts are brought end-to-end abutting engagement within the mould. At the completion of injection, the core parts are drawn axially out of the moulding; which is held axially by the mould parts, and the mould parts are then moved apart, the moulding adhering to the cooled mould part and then stripped by the ejector pins. The mould parts may be fixed axially, or movable axially relative to a fixed one of the core parts.

Venting of the mould cavity is permitted through the narrow annular gap of minimal radial width between the core parts and the mould parts. A normal sliding fit between the respective parts is found to permit adequate venting.

It will be readily understood by those skilled in the art that the advantage of the present invention can be secured in relation to many different forms of internal undercut recesses. The specific example described above is in many respects the most difficult case, i.e. a complete, annular recess. However the invention will also be applicable to the formation of undercut recesses of considerably smaller circumferential extent, whether extending purely circumferentially or helically.

In the extreme case the tubular component may have but two part annular projections axially spaced apart, for example one having an annular extent of 300° of arc and the other being of 60° of arc and aligned with the gap in the first mentioned projection. The invention is applicable not only to components of synthetic resin materials but for other rigid or semi-rigid materials for example hard rubber.

I claim:

1. A tubular component comprising a generally cylindrical moulding having a female coupling portion, said coupling portion comprising two axially spaced, circumferentially extending rows of spaced, internal projections integrally moulded with said cylindrical moulding, each projection in one row registering with a space defined between adjacent projections of the other row, and wherein each projection has a circumferential dimension which progressively reduces in a direction away from said other row.

2. A tubular component according to claim 1, wherein said projections of one said row decreasingly taper in radial thickness in a direction away from the other said row.

3. A tubular component comprising a generally cylindrical moulding having a female coupling portion, said coupling portion comprising two axially spaced, circumferentially extending rows of spaced, internal projections integrally moulded with said cylindrical moulding, each projection in one row registering with a space defined between adjacent projections of the other row, and wherein said projections of one row are each formed at one end adjacent said other row with a male coupling component locating surface, and at its other end, remote from said other row, with a ramp surface to facilitate insertion of a male coupling component from said other end.

4. A tubular socket component comprising an integral moulding of synthetic plastics material having an internal cylindrical cavity, and two axially spaced rows of internal projections within said cavity, integral with said component and interrupted by recesses defined between said projections, which recesses are aligned with respective corresponding projections in the other said row, said projections each terminating at one end in an abutment surface facing the opposite row of projections, which surfaces together form an annular recess for a male coupling component.

* * * * *